Sept. 24, 1935.  H. W. JONKHOFF  2,015,310
VEHICLE BOGIE CONSTRUCTION
Filed Aug. 7, 1934
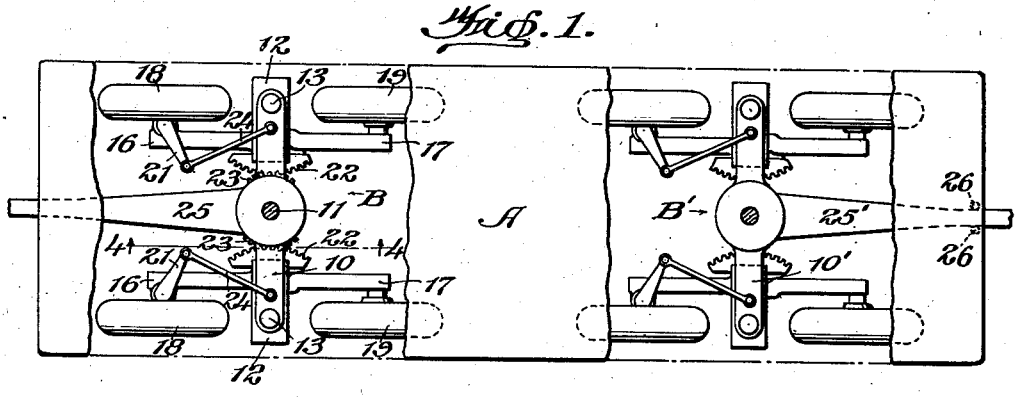
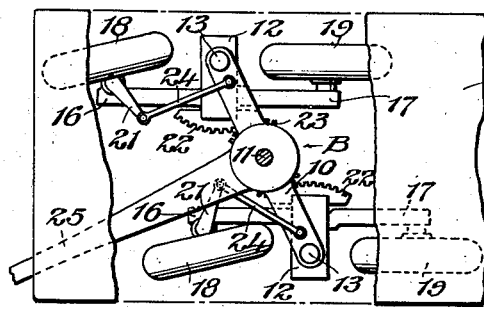
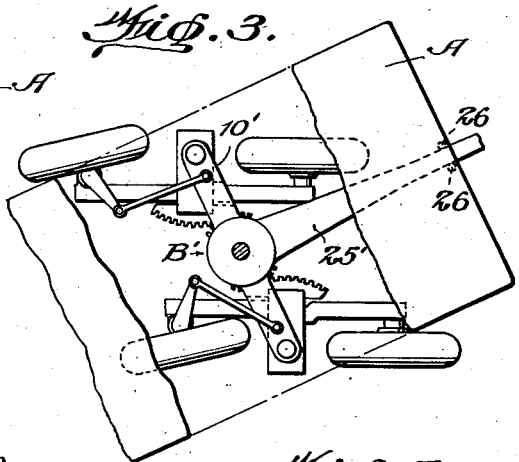
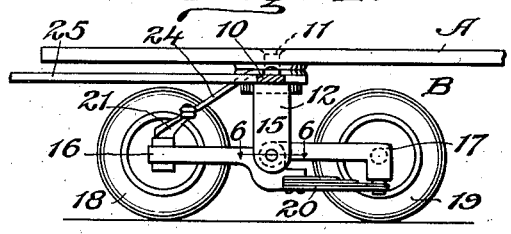
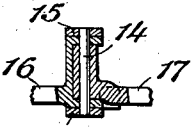
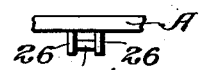
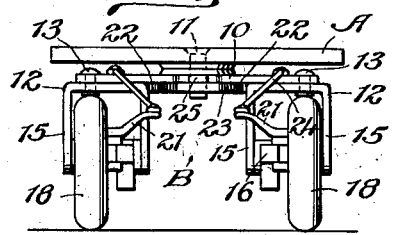
Inventor
Henri W. Jonkhoff,
By Carroll Bailey
Attorney Patented Sept. 24, 1935

2,015,310

UNITED STATES PATENT OFFICE 2,015,310

VEHICLE BOGIE CONSTRUCTION

Henri Wouter Jonkhoff, Dusseldorf, Germany

Application August 7, 1934, Serial No. 738,854

6 Claims. (Cl. 280—33.5)

This invention relates to improvements in bogies for use on road and similar vehicles generally and particularly for use on drawn vehicles such as trailers and the like, and has for one of its main objects to provide a bogie embodying a construction, and a connection with the vehicle body or chassis which it supports, such that, in the case of a trailer or the like having only a single bogie, or in the case of a trailer or the like having front and rear bogies, the wheels of the single bogie, or of the front bogie, as the case may be, are steered in a novel manner so as to track, or substantially track, the wheels of the vehicle by which the trailer or the like is drawn.

Another main object of the invention is to provide a bogie embodying a construction and a connection with the vehicle body or chassis which it supports, such that, in the case of a trailer or the like having front and rear bogies, the wheels of the rear bogie are steered in response to deviation of the body or chassis of the vehicle from movement in a straight line so as to track, or substantially track, the wheels of the front bogie.

Another special object of the invention is to provide a bogie which is capable of attaining the objects aforementioned and which does not require any change in its construction whether it is used either alone or at the front or at the rear of a trailer or the like.

Another object of the invention is to provide a bogie embodying steering features as aforementioned and which, at the same time, is of relatively simple, inexpensive construction, strong, durable and thoroughly reliable and efficient in use.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:

Figure 1 is a top plan view of a trailer equipped with front and rear pairs of bogies in accordance with the invention, parts of the trailer platform being shown broken away to disclose the underlying bogie constructions and the wheels of the bogies being shown in the positions they occupy when the trailer is travelling straight ahead.

Figure 2 is a view similar to Figure 1 of the front end portion of the trailer showing a status of the front bogies when the front end of the trailer is about to enter a curve and prior to the trailer having deviated from forward movement in a straight line.

Figure 3 is a view similar to Figures 1 and 2 of the rear end portion of the trailer showing a status of the rear bogies after the trailer has entered a curve and the trailer has deviated from forward movement in a straight line.

Figure 4 is a section on the line 4—4 of Figure 1.

Figure 5 is a front view of the trailer and the front bogies.

Figure 6 is a section on the line 6—6 of Figure 4.

Figure 7 is a detail rear end view of the trailer showing means to hold the cross beam of the rear bogies in a fixed relationship relative to the body or chassis of the trailer; and Figure 8 is a view diagrammatically illustrating the steering action of the bogies during travel of the trailer from a straight stretch of road into and around a curve to another straight stretch of road.

Referring to the drawing in detail, A designates, generally, the body or chassis of a vehicle, such as a trailer or the like, which is intended to be drawn by another vehicle and which, for convenience, is illustrated in the present instance as comprising simply a platform of elongated rectangular shape. Also, as illustrated in the present instance, the body A is supported by front and rear bogies designated generally as B, B', respectively, but as will hereinafter appear, either bogie B or B' may be used to the exclusion of the other.

Referring first to the front bogie B, it will be observed that the same comprises a cross bar 10 which is disposed beneath the body A and which, intermediate its ends, is pivoted to said body as indicated at 11 for rotary movement in a horizontal plane. It will also be observed that beneath the bar 10 at each end thereof is a frame 12 of inverted U-shape and that each frame is pivoted to the related end of the bar 10 as indicated at 13 for rotary movement in a horizontal plane relative to said bar.

A pin 14 connects the downwardly extending spaced arms 15 of each frame 12 and on each pin 14 are pivoted the inner ends of a pair of forwardly and rearwardly directed arms 16 and 17, respectively, the forwardly directed arm 16 of each pair having a wheel 18 pivotally mounted thereon for rotation or steering movements in a horizontal plane, and the rearwardly directed arm of each pair having a wheel 19 mounted thereon solely for rotation in its own plane. Connecting the arms 16 and 17 of each pair is a suitable spring 20 whereby said arms are maintained substantially horizontally disposed normally but are permitted to swing upwardly or downwardly relative to each other thus to provide a simple, practicable spring suspension for the body A.

The forward or steering wheels 18, 18 are rotatably mounted on axles (not shown) which in turn, have vertically disposed pivotal connections with the arms 16 whereby the said wheels 18, 18 are mounted on said arms for steering movements, and in accordance with the invention the pivoted axle structure of each wheel 18 has a steering arm 21 extending inwardly therefrom for the purpose of imparting steering movements to the steering wheels 18, 18.

Rigid with each frame 12 is a gear segment 22 which meshes with a gear or a companion gear segment 23 either rigid with the bar 10, or rotatably mounted on the pivot pin 11, whereby the arms 16, 17 of the respective pairs are maintained parallel regardless of the angular relationship of the bar 10 to the body A. Moreover, each steering arm 21 is connected by a rod 24 with the related end portion of the bar 10 at a point located a suitable distance inwardly of the pivotal connection 13 of the related frame 12 with said bar so that for any given amount of rotation of the bar 10 about its pivot 11, a certain amount of steering movement is imparted to each steering wheel 18.

Rigid with and extending forwardly from the bar 10 is a tongue 25 for connection with a pulling vehicle to couple the trailer A therewith and to swing the bar 10 on its pivot 11 in response to changes in the direction of travel of the pulling vehicle. In this connection it will be noted by particular reference to Figure 1 that the connections between the steering arms 21 and the bar 10 are such that when the tongue 25 is disposed parallel to the longitudinal axis of the trailer A the steering wheels 18, 18 are also disposed parallel to the longitudinal axis of the trailer and to each other. Thus, when the pulling vehicle is travelling straight ahead the bogie wheels are maintained parallel to each other and to the longitudinal axis of the trailer for straight ahead travel of the trailer. On the other hand, when the pulling vehicle deviates from travel in a straight course, the tongue 25 is swung to the right or to the left, as the case may be, and as a consequence steering movements are imparted to the steering wheels 18, 18 to cause them to track, or substantially track, the wheels of the pulling vehicle. In other words, assuming that the pulling vehicle enters a left hand turn in a roadway, it is apparent that the tongue 25 is swung to the left relative to the trailer body A and that, as a consequence, the bar 10 is rotated on its pivot 11 with the result that the right hand end portion of said bar 10 is swung forwardly and the left hand end portion thereof is swung rearwardly, as illustrated in Figure 2. Due to the gear connections 22, 23 between the frames 12 the arms 16, 16 and 17, 17 are maintained parallel, although they approach each other, and since the right hand pivot 13 moves forwardly a greater amount than the pivotal connection of the right hand rod 24 with the bar 10, and since the left hand pivot 13 moves rearwardly a greater amount than the pivotal connection of the left hand rod 24 with the bar 10, due to the pivots 13, 13 being located outwardly with respect to the pivotal connections of the rods 24 with said bar 10, it follows that left hand angular steering movements are imparted to the wheels 18, 18 and that the amounts of steering movements thus imparted to said wheels for any given angular movement of the tongue 25 depends upon the distance between the pivots 13 and the pivotal connections of the rods 24 with the bar 10, this distance being predetermined so that for a tongue which is connected a given distance from the pivot 11 with a pulling vehicle, just sufficient steering movements are imparted to the wheels 18, 18 to cause them to track, or substantially to track, the wheels of the pulling vehicle. Of course, the reverse operation takes place if the pulling vehicle enters a right hand curve and the tongue 25 is swung to the right, and, furthermore, after the turn has been negotiated and the pulling vehicle again enters a straight stretch of roadway, the tongue 25 and the wheels 18, 18 are, of course, returned to positions parallel with the longitudinal axis of the trailer. Thus, whether the trailer is of short length and is supported by only a single bogie as B, or whether the trailer is longer and is supported by front and rear bogies as shown, the front wheels of the single bogie, or of the front bogie, as the case may be, are steered so as to track, or substantially to track, the wheels of the vehicle by which the trailer is drawn.

The construction of the rear bogie B' is identical to that of the front bogie B except that the tongue 25' of the rear bogie extends rearwardly and normally is held against swinging movement relative to the trailer body A so that, to all intents and purposes, the bar 10' of the rear bogie may be considered as being rigid, normally, with the trailer body. In fact, the sole purpose of the tongue 25' is to enable shifting of the bar 10' relative to the body A for the purpose of steering the rear bogie during "backing" of the trailer. Therefore, if provision for steering the rear bogie during "backing" of the trailer is not desired, the tongue 25' may be eliminated and the bar 10' may be fastened rigidly to the body A.

Normally, that is, when the trailer is travelling straight ahead, the wheels of the rear bogie are disposed parallel to each other and to the longitudinal axis of the trailer, and the front steering wheels of said rear bogie are maintained in this position because of their connections with the cross bar 10'. The tendency of said wheels is, of course, to travel straight ahead. Consequently, when the trailer enters a curve and the course of the body A is changed, to the left, for example, as illustrated in Figure 3, the bar 10' is swung with the trailer body relative to the bogie wheels and steering movements thereby are imparted to the front wheels of the rear bogie in practically the same manner as set forth in connection with the steering wheels of the front bogie.

For the purpose of holding the tongue 25' normally in a fixed position relative to the body A, assuming that the rear bogie is provided with a tongue for the purpose stated, a pair of pins or lugs 26 may depend from the body A to receive the tongue therebetween, the tongue being either sufficiently flexible in a vertical direction to permit it to be deflected downwardly below the lower ends of said pins or lugs, or the latter being selectively retractible, thereby to permit the tongue to be swung laterally to steer the rear bogie as when "backing" the trailer as aforesaid.

Figure 8 of the drawing illustrates diagrammatically the action of the bogies B, B' during travel of the trailer from a straight stretch of roadway into and around a curve onto another straight stretch of roadway. The direction of travel of the trailer is indicated by the arrow and position "a" indicates the trailer as travelling a straight stretch approaching a curve; position "b" indicates the tongue and the steering wheels of the front bogie as having been swung substantially as shown and described in connection with Figure 2 prior to deviation of the trailer body from its straight ahead course, position "c" indicates the trailer body as having entered the curve and the front and rear bogies as having substantially the responsive positions illustrated in Figures 2 and 3, respectively, and position "d" indicates a restored normal status of the bogies after the trailer has negotiated the curve and has entered another straight stretch of roadway.

Without further description it is thought that the construction and operation of the bogies will be clearly understood. It is desired to point out, however, that while certain specific structures have been illustrated, the invention is capable of embodiment in other structures within its spirit and scope as defined in the appended claims. For example, in any case where the cross beam is held fixed relative to the body A, said cross beam constitutes to all intents and purposes a part of the body. Therefore, under such conditions it is apparent that the frames 12 may be pivoted directly to the body and that the ends of the rods 24 remote from the wheels may likewise be pivoted directly to the body instead of to the cross beam, which beam may, if desired, be eliminated.

I claim:

1. In combination, a vehicle body, a cross beam carried by said body, a pair of frames pivoted to said cross beam near opposite ends thereof, respectively, wheel supporting means carried by each frame, and a front and a rear wheel on each supporting means, the front wheels being pivotally mounted on said supporting means for steering movement.

2. The combination as set forth in claim 1 in which the cross beam is pivoted to the vehicle body and in which means are provided whereby pivotal movements of said cross beam impart steering movements to the steerably pivoted wheels.

3. The combination as set forth in claim 1 in which the cross beam is pivoted to the vehicle body, in which a tongue extends from said cross beam for swinging the same, and in which connections are provided between the steerably pivoted wheels and said cross beam whereby rotation of the latter imparts steering movements to said steerably pivoted wheels.

4. In combination, a vehicle body, a cross beam pivoted intermediate its ends to said body, a pair of frames pivoted to said cross beam near opposite ends thereof, respectively, wheel supporting means carried by each frame, a front and a rear wheel on each supporting means, the front wheels being pivotally mounted on said supporting means for steering movements, and connections between the latter wheels and the cross beam whereby swinging movements of the cross beam imparts steering movements to said wheels.

5. The combination as set forth in claim 4 including means to maintain a parallel relationship between the respective frames.

6. The combination as set forth in claim 1 in which each wheel supporting means comprises a forwardly and a rearwardly extending arm pivoted to its related frame for vertical movement, and in which spring means cooperate with said arms to resist upward pivotal movements thereof.

HENRI WOUTER JONKHOFF.